United States Patent [19]

Giesen et al.

[11] Patent Number: 5,020,895
[45] Date of Patent: Jun. 4, 1991

[54] LASER MIRROR HEAD

[76] Inventors: Adolf Giesen, Fröbelstr. 60, 7253 Renningen; Martin Bea, Allmandring 18 A, 7000 Stuttgart 80; Stefan Borik, Edelweissstr. 13, 7022 Leinfelden-Echterd. 1, all of Fed. Rep. of Germany

[21] Appl. No.: 462,602

[22] Filed: Jan. 9, 1990

[30] Foreign Application Priority Data

Jan. 10, 1989 [DE] Fed. Rep. of Germany ....... 3900467

[51] Int. Cl.⁵ .......................... G02B 7/18; G02B 5/10
[52] U.S. Cl. .................................... 350/608; 350/610; 372/107
[58] Field of Search .................... 350/610, 607, 608; 372/83, 35, 9, 107, 29, 99

[56] References Cited

U.S. PATENT DOCUMENTS

| 3,644,020 | 2/1972 | Shannon | 350/610 |
| 3,836,236 | 9/1974 | Kirk et al. | 350/610 |
| 3,909,118 | 9/1975 | Schmidt | 350/610 |
| 3,923,383 | 12/1975 | Engel et al. | 350/607 |
| 3,986,768 | 10/1976 | Peters et al. | 350/610 |
| 4,175,834 | 11/1979 | Sigman et al. | 350/610 |
| 4,175,835 | 11/1979 | Kuhn, Jr. | 350/610 |
| 4,190,327 | 2/1980 | Hughes | 350/608 |
| 4,934,803 | 6/1990 | Ealey | 350/610 |

Primary Examiner—Frank Gonzalez
Assistant Examiner—Susan S. Morse

[57] ABSTRACT

For power lasers, the shape of the mirror is an essential factor for the quality of the mode. In addition, a power laser usually has a plurality of mirrors. The shape of the mirrors may change during operation, for example due to heating. According to the invention, a hollow space is provided on the rear side of the mirror and pressure is applied to this hollow space to a greater or lesser degree, so that the geometry of the mirror changes under its influence.

20 Claims, 2 Drawing Sheets

LASER MIRROR HEAD

The invention relates to an apparatus for a mirror head of high power lasers.

BACKGROUND OF THE INVENTION

With high-power lasers, there has long been the desire for the TEM OO mode. The mirrors play a part in the possible distortion of the beam. The surface of the mirrors deforms, inter alia, due to the fact that they heat up. It is true that the mirrors are cooled. Nevertheless, the cooling cannot be ideal. In addition, if a multiplicity of mirrors are used, the cooling may differ, so that not only is there deformation of the mirrors but different deformation. The constructional measures to separate the cooling fluid from the laser gas are enormous.

OBJECT AND STATEMENT OF THE INVENTION

The object of the invention is to provide an apparatus with which the laser beam can be optimized when its shape changes in an unfavorable way. This correction is also to be possible during the operation of the laser. Apparatus of the type described include a metallic mirror having a reflective front side with an expose central region, a rear side and an outer rim. A first pressure-bearing surface is on the front side near the outer rim of the mirror, and a second pressure-bearing surface is on the rear side near the outer rim of the mirror. A fluid line arrangement is provided in a region of the mirror head remote from the mirror.

The object of the invention is achieved by the following features:

(a) the mirror is a disc that is thin in relation to the diameter of its exposed central area, (b) a hollow space is provided in the mirror head on the rear side of the mirror, and (c) the hollow space communicates with the fluid line arrangement. This enables one top produce convex mirrors by positive pressure or concave mirrors by negative pressure. The additional expenditure is minimal.

The invention also includes the following advantageous features:

The mirror is of a copper alloy and its reflective front side is polished. This achieves the effect that a mirror with good thermal conductivity is obtained which can be bent comparatively easily. If it is not vapor-deposited, for example with a gold layer, the latter is subjected to, neither tensile stress nor compressive stress.

The relation of the diameter of the exposed central region of the mirror to its thickness is 7.5:2±30%. this achieves the effect of a sufficiently thin mirror with sufficiently high surface, so that the pressure which has to be generated by the bending is technically readily controllable.

The rear side of the mirror presents a single limiting wall of the hollow space, and a seal is provided in the region of the rim of the mirror. This saves any intermediate elements. The pressure presses directly on the entire exposed rear side, and it is physically also easier to predict how the mirror will deform. The seal lies in the clamping region of the mirror and does not disturb the behavior of the mirror. In addition, this also minimizes the complexity of the seal.

The fluid line arrangement comprises at least one fluid feed line arrangement and at least one fluid discharge line arrangement. These features not only allow the mirror to be bent convexly or concavely, but also allow it to be cooled. Such fluids exist in any case in the field of high-power lasers, such as for example water, oil or the like. No special fluid reservoir is needed and also no additional lines, pressure generators of another type or the like.

The fluid feed line arrangement has a mouth in a central region of the rear side of the mirror, and a mouth of the fluid discharge line arrangement lies in the region of an edge of the hollow space. As a result, the region of the mirror which heats up most is cooled best, the assumption which should be made here being that about 1.5% of the laser power remains in the mirror as lost power and heats it up.

A plurality of fluid discharge line arrangements are provided, and the mouths of the fluid discharge line arrangements are arranged at regular angles. As a result, a clearly arranged, regular flow pattern of the fluid is obtained, the effect of which is predictable.

The fluid is water. Water is a particularly simple fluid, which at the same time is not compressible and nevertheless ecologically harmless.

The elasticity of the mirror has an absolute value at which the center of the mirror bends by amounts in the lower decamicrometer range when a full fluid pressure is applied. In trials it has been found that mirrors with these characteristic values can be used excellently.

The fluid feed line arrangements are connected to a pressure generator to which a pressure-setting device is connected and to a cooling device. These features allow pressure generation, cooling and pressure setting in a single cell.

A pressure display device is connected to the pressure generator. This feature provides a reproducible display for the convex bending or concave bending of the mirror.

The pressure display device is calibrated in mirror bending-state values. This feature saves conversion calculations.

The mirror bending-state values are related to the convex bending of the mirror when positive pressure is applied by the pressure generator. This provides a representative measure of the positive or negative convex bending.

The mirror bending-state values are the focal length of the mirror. This provides a measure which can be used well for optically operating instruments.

The pressure generator generates negative and/or positive pressure. This allows both a diverging mirror and a converging mirror to be operated. In the case of "and", all of the conditions between these two types can be produced infinitely variably. During the development of a laser apparatus, usually several test apparatus are built and tested in detail. If it is observed during such tests that the correcting mirror has to be adjusted in a convex manner only (of varying degrees), it is sufficient to produce only a positive pressure. Thus, the pressure generator is of simple design. The same is true when the correcting mirror has to be adjusted in a concave manner only. The pressure generator then has to produce only a negative pressure.

These two simple alternative designs are meant by the "or" term.

However, during laser operation deterioration of the laser beam may require a compensation range of the correcting mirror from convex to concave, and the pressure generator must be able to produce both positive and negative pressures.

It should be understood that "and" does not mean "the same time".

A pressure generator of the known gear pump type for example, may be switched from positive to negative pressure just by changing the direction of the rotation of its motor. Other types of pressure generators may require switching valves for interchanginng their inlet and outlet pipes.

The positive pressure is in the bar range. This makes for technically, easily controllable pressures, so that no inordinate equipment expenditure is necessary.

In a laser having a plurality of deflection mirrors, certain mirrors are of a different design than according to the invention This allows some of the deflection mirrors to be produced according to the old design.

Only one of the mirrors is designed according to the invention. This minimizes the costs further and allows, if appropriate, the invention to be retrofitted to existing lasers without otherwise disturbing the laser set-up.

The thickness of the mirror is not constant, at least in its central region. This allows forms of distortion of the mirror to be achieved which differ from those which occur with mirrors of the same material thickness. The correcting mirror has to compensate for defects caused by the other mirrors due to the fact that they are not exactly plane. If one or more mirrors cause a slight dispersion of the laser beam, the correcting mirror must focus the beam by the same amount.

The necessary shape of bending curvature of the correcting mirror is a clear consequence of the shape deformations which occur in the other mirrors and, therefore, in the laser beam. This curvature is well known under the law of optics.

DESCRIPTION OF THE DRAWINGS

A preferred exemplary embodiment of the invention is now described. In the drawings.

DETAILED DESCRIPTION

Figure 1:
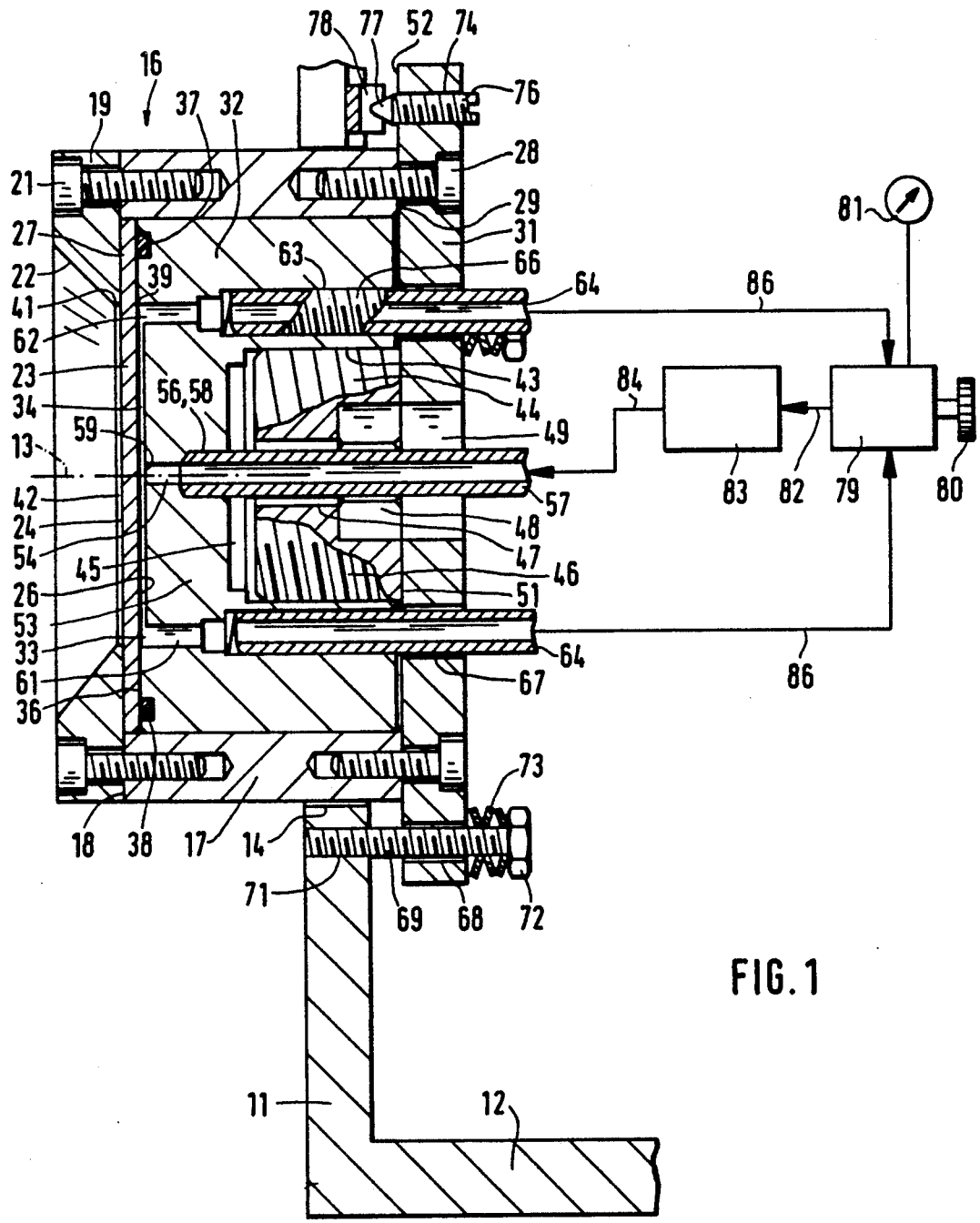
FIG. 1 shows a radial cross-section through a mirror head, with diagrammatic circuitry.

A wall 11 of a flange 12, otherwise shown broken away, has a through-bore 14 coaxial to the geometrical longitudinal axis 13. A mirror head 16 is seated in the said bore. A housing 17 is circular-cylindrical to the longitudinal axis 13 and extends gas-tightly in the through-bore 14. Screwed onto its left-hand end face 18, which lies coaxially and radially, by screws 21 is a holding ring 19.

The holding ring 19 has an outwardly directed bevel 22. A mirror 23 has a front side 24 and a rear side 26. The front side 24 is polished. Its marginal region 27 is covered by the holding ring 19 apart from 5 cm.

What is claimed is:

1. In an apparatus for a mirror head of high power lasers, comprising
   a metallic mirror having a reflective front side with an exposed central region, a rear side and an outer rim,
   a first pressure-bearing surface for the front side near the outer rim of the mirror,
   a second pressure-bearing surface for the rear side near the outer rim of the mirror, and
   a fluid line arrangement in a region of the mirror head remote from the mirror,
   the improvement wherein:
   (a) the mirror is a disc that is thin in relation to the diameter of its exposed central area,
   (b) a hollow space is provided in the mirror head on the rear side of the mirror so that the central region of the mirror is free to bend perpendicular to the front side, both toward the front side and toward the rear side, and
   (c) the hollow space communicates with the fluid line arrangement.

2. An apparatus as claimed in claim 1, wherein the mirror is of a copper alloy and its reflective front side is polished.

3. An apparatus as claimed in claim 1, wherein the rear side of the mirror presents a single limiting wall of the hollow space, and a seal is provided in the region of the rim of the mirror.

4. An apparatus as claimed in claim 1, wherein the fluid line arrangement comprises at least one fluid feed line arrangement and at least one fluid discharge line arrangement.

5. An apparatus as claimed in claim 4, wherein the fluid feed line arrangement has a mouth in a central region of the rear side of the mirror, and a mouth of the fluid discharge line arrangement lies in the region of an edge of the hollow space.

6. An apparatus as claimed in claim 4, wherein a plurality of fluid discharge line arrangements are provided, and the mouths of the fluid discharge line arrangements are arranged at regular angles.

7. An apparatus as claimed in claim 1, wherein the fluid is water

8. An apparatus as claimed in claim 1, wherein the elasticity of the mirror has an absolute value at which the center of the mirror is bent out several decamicrometers in response to application of maximum fluid pressure available in the fluid line arrangement.

9. An apparatus as claimed in claim 5, wherein the fluid feed line arrangements are connected to a pressure generator to which a pressure-setting device is connected and to a cooling device.

10. An apparatus as claimed in claim 9, comprising a pressure display device connected to the pressure generator.

11. An apparatus as claimed in claim 10, wherein the pressure display device is calibrated in mirror bending-state values.

12. An apparatus as claimed in claim 11, wherein the mirror bending-state values are related to the convex bending of the mirror when positive pressure is applied by the pressure generator.

13. An apparatus as claimed in claim 11, wherein the mirror bending-state values are the focal length of the mirror.

14. An apparatus as claimed in claim 9, wherein the pressure generator generates positive pressure.

15. An apparatus as claimed in claim 14, wherein the positive pressure is in the bar range.

16. A high power laser having a plurality of deflection mirrors wherein at least one deflection mirror is of a first design that comprises
   a metallic mirror having a reflective front side with an exposed central region, a rear side and an outer rim, a first pressure-bearing surface for the front side near the outer rim of the mirror, a second pressure-bearing surface for the rear side near the outer rim of the mirror; and a fluid line arrangement in a region of the mirror head remote from the mirror, wherein:
  (a) the mirror is a disc that is thin in relation to the diameter of its exposed central area,
  (b) a hollow space is provided in the mirror head on the rear side of the mirror so that the central region of the mirror is free to bend perpendicular to the front side, both toward the front side and toward the rear side, and
  (c) the hollow space communicates with the fluid arrangement,
  and other deflection mirrors are of a different design.

17. A high power laser as claimed in claim 16, wherein only one of the deflection mirrors is of the first design.

18. An apparatus as claimed in claim 1, wherein the mirror has a planar cross section with a varying thickness, at least in the central region of the mirror.

19. An apparatus as claimed in claim 9 wherein the pressure generator generates negative pressure.

20. In an apparatus for a mirror head of high power lasers, comprising
  a metallic mirror having a reflective front side with an exposed central region, a rear side and an outer rim,
  a first pressure-bearing surface for the front side near the outer rim of the mirror,
  a second pressure-bearing surface for the rear side near the outer rim of the mirror,
  a fluid line arrangement in a region of the mirror head remote from the mirror,
  and the improvement wherein:
    (a) the mirror is a disc that is thin in relation to the diameter of its exposed central area,
    (b) a hollow space is provided in the mirror head on the rear side of the mirror so that the central region of the mirror is free to bond perpendicular to the front side, both toward the front side and toward the rear side,
    (c) the hollow space communicates with the fluid line arrangement, and
    (d) the relation of the diameter of the exposed central region of the mirror to its thickness is $7.5:2 \pm 30\%$.

* * * * *

UNITED STATES PATENT AND TRADEMARK OFFICE
CERTIFICATE OF CORRECTION

PATENT NO. : 5,020,895
DATED : June 4, 1991
INVENTOR(S) : Giesen et al.

It is certified that error appears in the above-identified patent and that said Letters Patent is hereby corrected as shown below:

Column 3,
Line 60, insert -- diameter, so that the 1.5 cm beyond this diameter is available for secure holding. The laser beam, running coaxially to the geometrical longitudinal axis 13, is 30 mm in diameter, so that only 75% of the non-covered front side 24 is impinged by the laser beam and marginal characteristics of the mirror 23 can be ignored.

As essentially coaxial cover 31, which - like the holding ring 19 and the housing 17 - is flexurally quite rigid, is screwed by means of screws 28 onto the rear end face 29 of the housing 17. In the housing 17, to the right of the mirror 23 and to the left of the cover 31, there is a metallic pressure element 32, which has a pot-shaped cross section. Where it is opposite the rear side 26, the outside 36 has a distance from the latter, so that here a hollow space 33 of approximately 1 mm thickness and a radius of 5 cm is produced. Where the pressure member 32 is opposite the holding ring 19 in its outer marginal region, the outer face 36 projects by the previously mentioned 1 mm further to the left. The pressure member 32 is a rotational solid generated about the geometrical longitudinal axis 13, which according to the drawing is coaxial to the geometrical longitudinal axis 13. Recessed into the outer face 36 from the left is a groove 37, in which an O-ring 38 lies. If the pressure member 32 is pressed to the left, relative to the housing 17, mirror 23 and holding ring 19, not only the O-ring 38 seals fluid-tightly and gas-tightly. What is more, an exact clamping of the mirror 23 is produced between the corner 39, formed by the jump between outer face 34 and outer face 36, and the corner 41, formed by the right-hand end face of the holding ring 19 and the approximately 1 mm high through-bore 42.

The outer face of the central and coaxial hollow space 43 of the pressure member 32 has an internal thread 43. A screw 44 with external thread 46 is screwed into the latter. The screw 44 has a central through-bore 47 and a hexagon socket 48, which is accessible from the right due to a central hole 49 of the cover 31. If the screw 44 is screwed out from the internal thread 43, the right-hand end face 51 of the screw 44 presses against the left-hand face 52 of the cover 31 and, as a result, the O-ring 38 is pressed together with outer face 36, marginal region 27 against the right-hand end face of the holding ring 19, The pressure member 32 has in its bottom 53 a central bore 54. In its right-hand region, the latter has an internal thread 56, into which a central tube 57 is screwed with its external thread 58. The central tube 57 crosses through the through-bore 47 without contact. The mouth 59 of the central bore 54 opens out into the hollow space 33. Radially in front of the outer face 36, the pressure member 32 has outer bores 61, the mouth 62 of which likewise communicates with the hollow space 33. The outer bores 61 have internal threads 63, into which outer tubes 64 are screwed by their external threads 66. The outer tubes 64 cross through the cover 31 in appropriate through-bores 67, so that the outer tubes 64 prevent the pressure member 32 from rotating when the screw 44 is unscrewed.

UNITED STATES PATENT AND TRADEMARK OFFICE
CERTIFICATE OF CORRECTION

PATENT NO. : 5,020,895
DATED : June 4, 1991
INVENTOR(S) : Giesen et al.

It is certified that error appears in the above-identified patent and that said Letters Patent is hereby corrected as shown below:

In order to be able to adjust the entire unit seated in the though-bore 14, the cover 31 has in its rim projecting beyond the housing 17 three angularly evenly distributed through-bores 68, into which screws 69 are screwed, the threads of which are seated in threaded bores 71. Cup springs 73 are seated between the head 72 and the cover 31. The cover 31, and consequently the entire mirror head 16, is thus forced to the left by the three angularly evenly distributed screws 69. Provided in likewise even angular distribution in the marginal region of the cover 31 are three threaded through-bores 74, into which setting screws 76 are screwed, which press with threir foot 77 against blocks 78, which are fastened to the wall 11. By turning the three setting screws 76, the geometrical longitudinal axis 13 of the mirror head 16 can be adjusted overall. With a wheel 80, the pressure in a pressure generator 79 can be adjusted up to 8 bar. The pressure, calibrated in focal length values, is displayed in a display 81. The pressure generator 79 supplies water via a line 82 to a cooler 83, which conducts this water via a line 84 to the central tube 57. From the mouth 59 of the latter, it passes into the hollow space 33. For this case of positive pressure, the mirror 23 is forced at 8 bar by 35 µm to the left where the geometrical longitudinal axis 13 passes through it. The water flows in the hollow space 33 in disc form outwards as far as the mouths 62 and then passes again via the outer tubes 64 and lines 86 back to the pressure generator 79.

Figure 2:
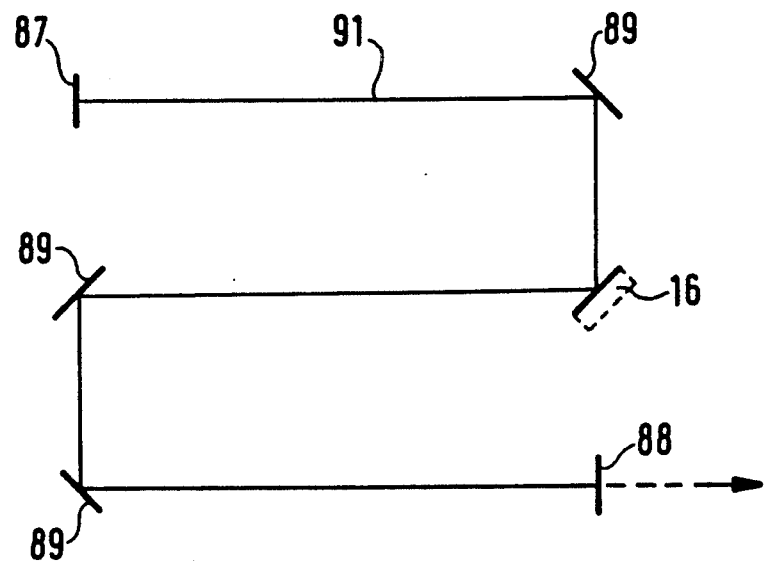
FIG. 2 shows a diagrammatic representation of the laser path.

According to Fig. 2, this is a triple-folded laser with 100% end mirror 87 and a partialy transmitting end mirror 88. Three mirror heads are of the conventional shape and one mirror head 16 according to the invention is provided. The laser beam 91 is corrected with the latter head alone.

Figure 3:
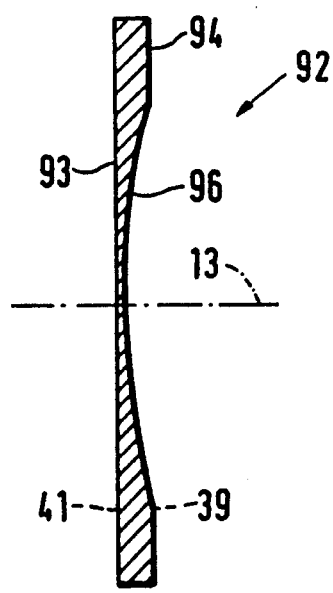
FIG. 3 shows a cross-section through a mirror of inconstant thickness.

According to Fig. 3, we have, as before, a mirror 92 of which the front side 93 is plane-flat and polished. As before, its rear side is parallel to the front side 93 in the region of the holding rim 94. However, where it is inwards of the corners 39, 41 it has a concavely shaped rear side 96, the thinnest point of which lies in the geometrical longitudinal axis 13.

UNITED STATES PATENT AND TRADEMARK OFFICE
CERTIFICATE OF CORRECTION

PATENT NO. : 5,020,895
DATED : June 4, 1991
INVENTOR(S) : Giesen et al.

It is certified that error appears in the above-identified patent and that said Letters Patent is hereby corrected as shown below:

The bending of the mirrors 23, 92 can be set manually at the wheel 80. However, a feedback device (not shown) can also be used, which detects the quality of the laser beam 91 and regulates the pressure generator 79 during operation of the laser in such a way that the pressure bends the mirror 23, 92 concavely or convexly, as required. --

Signed and Sealed this

Fifteenth Day of January, 2002

Attest:

JAMES E. ROGAN
Attesting Officer     Director of the United States Patent and Trademark Office